UNITED STATES PATENT OFFICE.

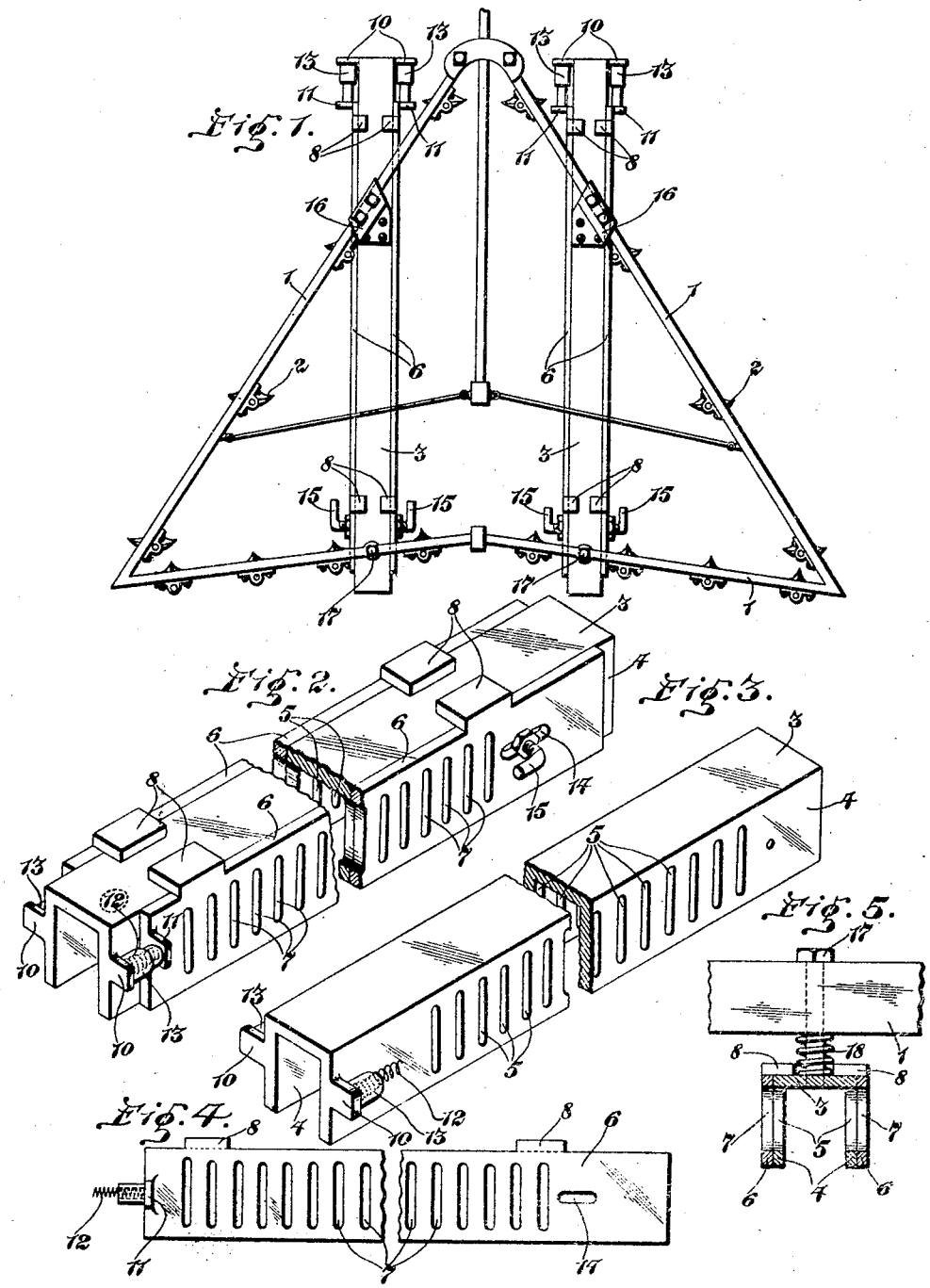

MARTIN J. STELZER, OF ST. LOUIS, MISSOURI.

AGRICULTURAL IMPLEMENT.

1,324,938.     Specification of Letters Patent.     Patented Dec. 16, 1919.

Application filed June 2, 1919. Serial No. 301,157.

*To all whom it may concern:*

Be it known that I, MARTIN J. STELZER, a citizen of the United States, residing at the city of St. Louis and State of Missouri, have invented a new and useful Agricultural Implement, of which the following is a specification.

This invention relates to improvements in agricultural implements, and more particularly to a guard or shield to be attached to a harrow or cultivator to prevent the dirt from covering up the small stalks or vegetation planted in rows.

An object of the invention is to provide a shield or guard for attachment to cultivator implements whereby only a small quantity of the soil is permitted to approach the rows in which the plants are planted, thereby preventing the covering of the plants when they are in the early stage of growth.

Other objects will appear from the following detailed description, taken in connection with the drawing in which—

Figure 1 is a plan view of the invention applied to a known type of harrow.

Fig. 2 is a perspective broken section of the construction of the invention.

Fig. 3 is a broken perspective of the frame constituting the shield or guard with the side members removed.

Fig. 4 is a broken elevation of one of the side members.

Fig. 5 is a detailed view illustrating the connection at the rear of the shield with the frame of the harrow.

As illustrated in the drawing the invention is applied to a standard form of harrow, but it will be understood that the invention may be applied to cultivators or other cultivating agricultural implements of various types. As illustrated the harrow to which the invention is applied comprises a triangular frame member 1 having arranged thereon a series of hoes 2, it being understood that the hoes are arranged so as to pulverize or cultivate the soil and to bank it in rows, the number of rows formed of course being dependent upon the size of the cultivating implement. In the present instance the harrow is arranged to form two rows at a time.

The present invention comprises an inverted U-shaped frame member including a top wall 3 and side walls 4. The frame may be made of sheet steel bent in the form of an inverted U, or it may be of cast metal if preferred. The side walls of the frame have a series of vertical slots 5 therein running substantially the full length of the wall. Sliding side members 6 are arranged in association with the side members of the frame and have therein a series of slots 7. Any suitable means of attaching the side members 6 to the side walls of the frame may be employed and I have illustrated one satisfactory arrangement. This arrangement includes the providing of lateral lugs 8 on the side members 6, the lugs bearing on the top wall 3 of the main frame member, and attaching one end of the member 6 to the side wall of the frame member by providing transverse lugs 10 on the frame and lugs 11 on the end of the member 6, and joining the two lugs by a contractile spring 12. The spring may be protected from contact with the soil and thereby prevent the clogging of the coils thereof by a telescoping guard 13. Near the opposite end of the member 6 is a longitudinal slot 14 through which projects a lock bolt 15.

In normal adjustment the slots 5 and 7 are in full serial registration, but the width of the openings through the member 6 and the side wall 4 may obviously be adjusted by the longitudinal movement of the member 6 with respect to the side wall 4.

Shields constructed as described may be attached in series to the cultivating implement so that as the implement is moved over the surface of the ground to be cultivated, the shield will extend over the area in which the rows are formed. The soil will be banked by the operation of the hoes of the implement against the side walls of the shield and a quantity of the finely pulverized soil will pass through the slots in the side of the shield. The amount of the soil passing through can be controlled by the adjustment of the members 6 as heretofore described.

Any suitable connection between the shield and the frame of the harrow or other agricultural implement to which it is applied may be employed. As illustrated the forward attaching connection between the frame and the shield comprises an angular bracket 16, a flexible or resilient metal, one wall of which is attached to the upper wall of the shield and the other to the frame of the harrow. It is preferable to provide a yielding connection for the rear end of the shield, and in the embodiment shown a bolt 17 passing through the frame member and connected at its lower end with the top wall of the frame is provided. An expansion spring 18, surrounding the bolt 17, is interposed between the top wall of the shield and the underface of the frame member.

The construction of the invention is particularly adaptable for the cultivation of corn, cotton, or similar growth when the vegetation is in the early stage of growth. The shield prevents the banking of the soil on top of the plants, but permits sufficient fresh soil to be deposited about the roots of the plants to cover up the weeds or grass that may grow with the plants of the crop.

I am aware that the construction may be modified in various particulars without departing from the spirit and scope of the invention. I do not limit myself therefore to the exact features shown and described, but what I claim and desire to secure by Letters Patent, is:—

1. In an agricultural implement, the combination with the frame of the implement, of an inverted U-shaped shield, having a series of spaced vertical slots in the side walls thereof, a pair of longitudinally adjustable plates, each having a series of vertical spaced slots therein registering with the slots in the side walls of the shields, means for holding the plates in different relative adjustments with respect to the side members of the frame, whereby the quantity of earth delivered to the interior of the shield may be controlled, a resilient connection between the shield and the frame of the implement near one end of the shield, and a yieldable connection between the frame and the shield near the opposite end.

2. In an agricultural implement, having a main frame, an attachment comprising an inverted U-shaped integrally formed shield, a connection between the shield and the frame of the implement for resiliently securing it to the frame near one end, and a yieldable connection between the shield and the frame at the other end, permitting the vertical movement of the shield with respect to the frame.

MARTIN J. STELZER